United States Patent [19]
Armitt et al.

[11] 3,834,119
[45] Sept. 10, 1974

[54] ICE CREAM SANDWICH WRAPPING MACHINE

[75] Inventors: John Armitt, Kearny; Paul Guerrero, Elizabeth; Robert J. Peterson, Jackson, all of N.J.

[73] Assignee: The Quaker Oats Company, Chicago, Ill.

[22] Filed: Sept. 27, 1972

[21] Appl. No.: 292,658

[52] U.S. Cl. ................................................ 53/230
[51] Int. Cl. ...................... B65b 11/54, B65b 49/08
[58] Field of Search ........................... 53/220–230, 53/232; 198/25, 160, 167, 170, 172, 173

[56] References Cited
UNITED STATES PATENTS

| | | | |
|---|---|---|---|
| 740,457 | 10/1903 | McGirr | 53/222 |
| 1,356,722 | 10/1920 | Kaupke | 198/160 X |
| 2,677,900 | 5/1954 | Mann | 198/25 X |
| 2,794,404 | 6/1957 | Rapp | 99/450.4 |
| 3,006,119 | 10/1961 | Fingerhut | 53/230 X |
| 3,080,691 | 3/1963 | Benner | 53/228 X |
| 3,339,339 | 9/1967 | Hull et al. | 53/223 |
| 3,600,875 | 8/1971 | Buob | 53/230 X |
| 3,739,545 | 6/1973 | Latike | 53/230 X |

Primary Examiner—Travis McGehee
Assistant Examiner—John Sipos
Attorney, Agent, or Firm—Donnie Rudd

[57] ABSTRACT

An ice cream sandwich wrapping machine is disclosed of the type that takes ice cream sandwiches from a conveyor and places them on a platform whereon a wrapper is first tucked under the rear portion of the sandwich, then tucked under the end portions of the sandwich, and thereafter moved off the platform so that the wrapper is tucked under the front portion of the sandwich. This invention specifically discloses a means for moving the ice cream sandwiches from the conveyor to the platform with such means comprising a rotating shaft having three tines equally spaced thereon with the tines being curved away from the direction of operational motion of the shaft.

The disclosure further includes the improvement wherein the end tuckers comprise plates on either side of the ice cream sandwich with the plates having holes therein and means for moving tucking fingers through the openings to tuck the wrapper underneath the ends of the ice cream sandwiches.

1 Claim, 9 Drawing Figures

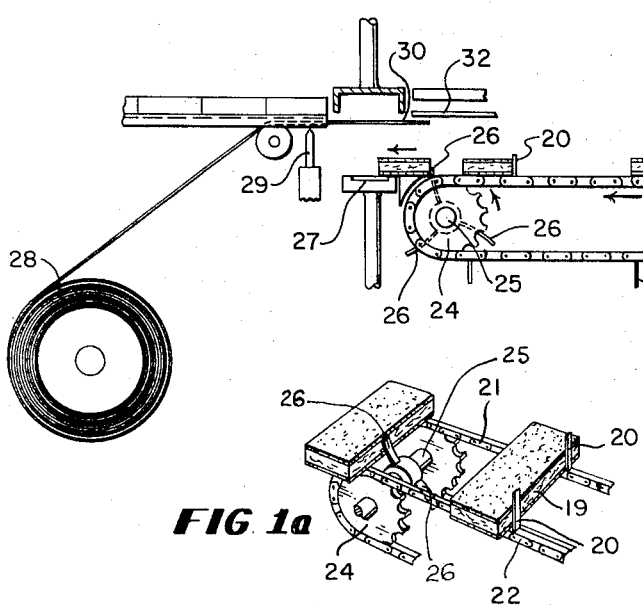
FIG. 1
FIG. 1a
FIG. 2
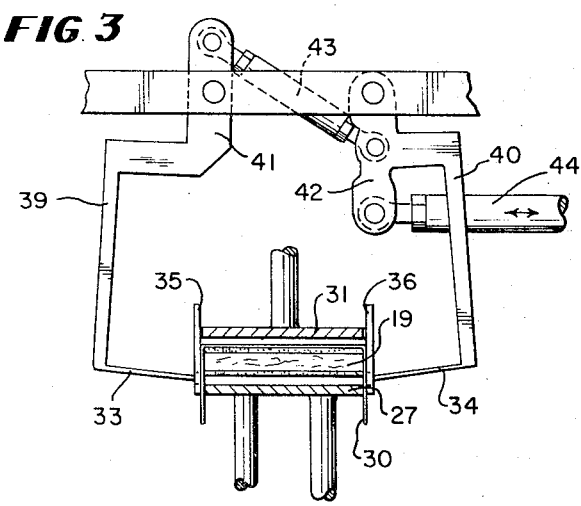
FIG. 3
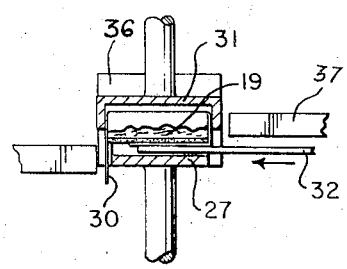
FIG. 4

ICE CREAM SANDWICH WRAPPING MACHINE

BACKGROUND OF THE INVENTION

1. Field of the Invention

This invention relates to a machine for placing a foil wrapper or the like around an ice cream sandwich after the ice cream sandwich is produced on an ice cream sandwich machine such as the one disclosed in U.S. Pat. No. 3,316,860.

2. Description of the Prior Art

In recent years a variety of ice cream sandwich machines have been available for rapidly producing completed ice cream sandwiches. Examples of these machines are disclosed in U.S. Pat. Nos. 2,794,404, 3,119,353, and 3,316,860. Each of these machines produces a sandwich which is deposited on a plurality of moving chains, usually two, which have catches thereon to engage the sandwich and take it to a wrapping machine. Prior wrapping machines have each utilized a cut segment of a predetermined pattern of wrapper with some type of manipulation for getting the wrapper completely around the sandwich and then tucking the ends underneath the sandwich. There have been two apparent problems in wrapping machines associated with the above-described ice cream sandwich machines. One of the major problems has been that the ice cream sandwiches have tended to catch in the conveyor when an attempt is made to move the sandwich from the conveyor into the wrapping machine. The other problem has been in accomplishing the tucking of the end portions of the wrapper underneath the ice cream sandwich. Our invention overcomes both of these problems.

SUMMARY OF THE INVENTION

It is an object of this invention to produce a machine for rapidly wrapping individual ice cream sandwiches in a foil wrapper or the like.

It is another object of this invention to provide an apparatus for moving ice cream sandwiches off of a conveyor and onto the platform of an ice cream sandwich wrapping machine.

It is a further object of this invention to provide an improvement for tucking the end portions of a wrapper underneath the ice cream sandwich in an ice cream sandwich wrapping machine.

The objects of this invention are accomplished by an ice cream sandwich wrapping machine for rapidly wrapping individual ice cream sandwiches in a foil or the like, said wrapping machine comprising a conveyor comprising a pair of endless spaced apart moving tracks with catches spaced upon the tracks to engage and move ice cream sandwiches with the movement of the tracks; means for moving the pair of tracks in the same speed and direction toward an elevator; a three tined pusher, said three tined pusher having the three tines thereon equally spaced about the center thereof and said tines curving away from the direction of operational motion of the tines; means for turning the tines to force ice cream sandwiches upon an elevator; an elevator, said elevator in its lowered position forming a platform substantially even with and continuing the upper portion of the moving tracks, and said elevator having a platform portion thereon substantially the same size as one side of an ice cream sandwich; means for moving the elevator up and down in timed relationship to the other moving parts of the wrapping machine; means for placing a predetermined piece of wrapping material above the elevator; a form; means for moving the form adjacent to ice cream sandwiches to press the front and rear of a wrapper downward over the sandwich; a rear tucker for tucking the wrapping material around the rear of the ice cream sandwich; a side tucking apparatus, said side tucking apparatus comprising a pair of plates disposed on either side of the elevator with said plates having openings therein and means for moving a pair of end tuckers through the openings to force the wrapping material under the ends of the ice cream sandwiches; and means for moving ice cream sandwiches off the elevator and onto a conveyor and thereby tucking the front portion of the wrapping material under the ice cream sandwich.

The objects of this invention are further accomplished in an ice cream sandwich wrapping machine of the type having a pair of moving tracks with catches thereon to move ice cream sandwiches upon a platform type elevator, wherein the improvement exists comprising a three tined pusher for engaging the sandwiches and moving them from the tracks to the platform said three tined pusher comprising a rotatable shaft substantially at the end of the tracks and adjacent to the elevator and with the three tines equally spaced about the circumference of the shaft and curving away from their direction of operational movement; and means for moving the rotatable shaft so that the tines move ice cream sandwiches from the tracks to the platform.

The objects of this invention are still further accomplished in an ice cream sandwich wrapping machine of the type that places ice cream sandwiches on a platform, presses a wrapper down over the front and rear of the sandwich, tucks the wrapper under the rear of the sandwich, then tucks the wrapper under the ends of the sandwich, and thereafter moves the sandwich off the platform to tuck the wrapper under the front of the sandwich, wherein the improvement exists wherein the end tuckers comprise a pair of plates having openings therein and having a pair of tucking fingers for moving through the openings to tuck the wrappers under the sandwich and includes means for moving the tucking fingers through the openings.

The objects of this invention are still further accomplished by an improvement in the above apparatus wherein the means for moving the tucking fingers through the openings comprises a scissors-like lever device wherein movement on a portion thereof causes the tucking fingers to open and close toward one another and includes means for moving the device to cause the tucking fingers to move back and forth.

Briefly described, this invention has two key features. First, the wrapping machine includes a three tined pusher for pushing the sandwiches from the conveyor onto the platform of an elevator. These tines are equally spaced on a rotatable shaft. That is, they are each 120° from the adjacent tine. Each of the tines curves gradually away from the direction of motion of the shaft when the shaft is operating. The result is that the slightly curved tine meets the ice cream sandwich at the appropriate time and moves it onto the platform. The invention further includes the end tucking device wherein a pair of plates are each disposed one on each end of an elevated ice cream sandwich in such a manner as to force the wrapper down and over the ends of the ice cream sandwich and wherein the plates have openings along the bottom of the ice cream sandwich so that tucking fingers can move through the openings to push the wrapper underneath the ends of the ice cream sandwich.

BRIEF DESCRIPTION OF THE DRAWINGS

Our invention may be more fully described but is not limited by the attached drawings wherein:

FIG. 1 represents a side view of the wrapping machine of my invention;

FIG. 1A illustrates a perspective view showing the rotating tined member;

FIG. 2 shows the elevator portion of the wrapping machine;

FIG. 3 is a front view along the line 3—3 of FIG. 2;

FIG. 4 is a side view showing the rear tucking portion;

Figure 5:
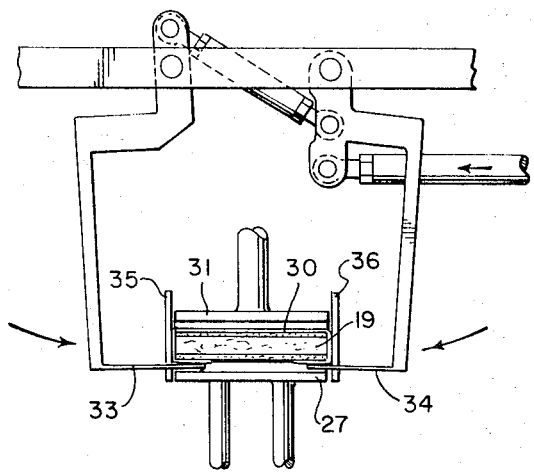
FIG. 5 is a rear view showing the tucking fingers.
Figure 5A:
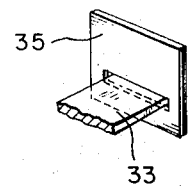
FIG. 5A is a perspective view of the end plates.
Figure 6:
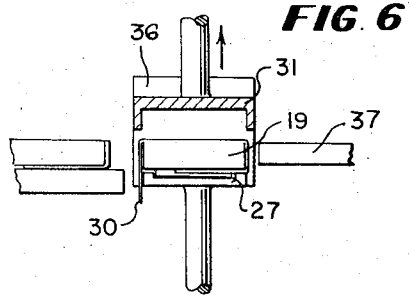
FIG. 6 is a side view showing the ice cream sandwich wrapped on all but the front side.
Figure 7:
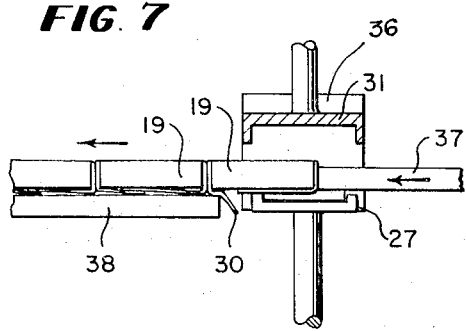
FIG. 7 is a side view showing the final wrapping of the ice cream sandwich.

In the drawings we have used the numeral 11 to refer to a supply nozzle which supplies ice cream to the ice cream sandwich machine. On either side of the nozzle are trays 12 and 13 which supply ice cream sandwich wafers 14 to the depositing head 15. The wafers each follow the ice cream 16 down into the slotted grooves 17 to form an ice cream sandwich. The rotating slotted wheel 18 is moved in step-wise motion to force the wafers to cut the ice cream off thus forming the ice cream sandwich 19. After ice cream sandwiches 19 move into the horizontal position they are engaged by catches 20 on chains 21 and 22. The chains form an endless conveyor by rotating about moving sprockets 23 and 24 which are appropriately attached to moving shafts which are attached to motors or the like not herein shown. Located near the depositing end of the conveyor is a rotating shaft 25 for rotating the three tines 26 to rapidly shove the ice cream sandwiches away from the catches 20 and onto elevator platform 27. A predetermined amount of foil 28 is cut by knife 29 or the like to form wrapper 30. The elevator then moves up onto the wrapper 30 and into form 31 wherein the front and rear portions of the foil are pressed downward over the front and rear sections of the ice cream sandwich. After this is accomplished, a rear tucker 32 moves under the rear of the ice cream sandwich tucking the wrapper thereunder as shown in FIG. 4. Next the end tucking fingers 33 and 34 move through end plates 35 and 36 and tuck the end portions of the wrapper underneath the ice cream sandwich. These fingers move through the openings in the end plates which are located near the bottom portion of the sandwich properly located to force the tucking fingers underneath the sandwich. Next the mold moves upward and a pusher 37 pushes the ice cream sandwich off the platform 27 onto conveyor 38 which has a platform thereon to force the wrapper underneath the ice cream sandwich and if desired, to appropriately heat the foil to seal it around the sandwich. In the particular embodiment of this invention, the tucking fingers 33 and 34 are respectively attached to arms 39 and 40 which are moved by levers 41 and 42 interconnected by connecting rod 43 and attached to movement rod 44. As the movement rod moves back and forth, it forces the fingers 33 and 34 to open and close and go underneath and out away from the ice cream sandwich thus tucking the wrapper underneath the ends of the ice cream sandwich.

DESCRIPTION OF THE PREFERRED EMBODIMENT

The preferred embodiment of the three tined pushing device is illustrated in FIGS. 1 and 1A of the drawings. The preferred embodiment of the end tucking fingers is illustrated in FIGS. 3 and 5 of the drawings.

Having fully described this new and unique invention we claim:

1. An ice cream sandwich wrapping machine for taking ice cream sandwiches from a multi-slotted depositor and rapidly wrapping the individual ice cream sandwiches in a foil or the like, said wrapping machine comprising a conveyor comprising a pair of endless spaced apart moving tracks with catches equally spaced apart upon the tracks to engage and move ice cream sandwiches with the movement of the tracks; means for moving the pair of tracks in the same speed and direction toward an elevator; a three tined pusher, said three tined pusher having the three tines thereon equally spaced about the center thereof and being circumferentially spaced apart at their outer most points a distance approximately equal to the spaces between the equally spaced apart catches, and said tines curving away from the direction of operational motion of the tines; means for turning the tines to force ice cream sandwiches upon an elevator, said means for turning the tines to force the ice cream sandwiches upon an elevator being in timed relationship with the movement of the tracks and the multi-slotted depositor such that the equally spaced apart catches each engage an ice cream sandwich for movement onto the endless spaced apart moving tracks and each tine of said three tined pusher engages an ice cream sandwich to force it upon the elevator, said tines having a circumferential speed substantially the same as the linear speed of the moving tracks; an elevator, said elevator in its lowered position forming a platform substantially even with and continuing the upper portion of the moving tracks, and said elevator having a platform portion thereon substantially the same size as one side of an ice cream sandwich; means for moving the elevator up and down in timed relationship to the other moving parts of the wrapping machine; means for placing a predetermined piece of wrapping material above the elevator; a form located directly above the elevator; means for moving the elevator upward into the form to press the front and rear of a wrapper downward over the sandwich; a rear tucker for tucking the wrapping material around the rear of the ice cream sandwich; a side tucking apparatus, said side tucking apparatus comprising a pair of plates disposed on either side of the elevator with said plates having openings therein and means for moving a pair of end tuckers through the openings to force the wrapping material under the ends of the ice cream sandwiches; and means for moving ice cream sandwiches off the elevator and onto a conveyor and thereby tucking the front portion of the wrapping material under the ice cream sandwich.

* * * * *